United States Patent Office

3,103,515
Patented Sept. 10, 1963

3,103,515
BASIC ESTERS OF 1-BENZOXACYCLOALKANE-
CARBOXYLIC ACIDS
Harold Elmer Zaugg, Lake Forest, Robert William De
Net, Waukegan, and Raymond John Michaels, Jr.,
Mundelein, Ill., assignors to Abbott Laboratories, Chicago, Ill., a corporation of Illinois
No Drawing. Filed June 8, 1961, Ser. No. 115,605
15 Claims. (Cl. 260—292)

This invention is concerned with new and novel basic esters of 1-benzoxacycloalkanecarboxylic acids of the formula

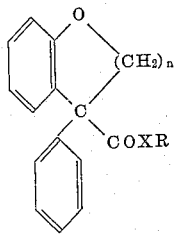

and methods for their preparation. In this and succeeding formulae, $n$ is 1, 2 or 3, X is oxygen or sulfur and R is one of the following radicals:

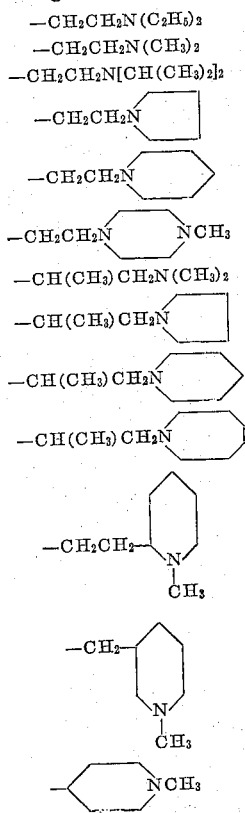

and

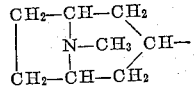

The basic esters of this invention can be isolated as crystalline solids or colorless liquids in the form of their free bases or more conveniently as solid, crystalline, acid-addition salts such as the hydrochloride, oxalate, benzoate, hydrobromide and the like. The esters and their acid-addition salts are useful as analgesics, hypotensive agents, local anesthetics and antispasmodics. For such use, the compounds can be employed orally, intravenously or intramuscularly alone or in the form of tablets, solutions, suspensions or emulsions admixed with a nontoxic, pharmaceutical, liquid or solid carrier. In representative operations, a 1% aqueous saline solution of β-diethylaminoethyl 5-phenyl-2,3,4,5-tetrahydro-1-benzoxepin-5-carboxylate injected adjacent to the sciatic nerve of a guinea pig produced nerve block causing sensory anesthesia to a portion of the pig's leg for over three hours. In another test, an intravenous injection of an aqueous saline solution of (1-methyl-3-piperidylmethyl) 3-phenyl-2,3-dihydro-3-benzofurancarboxylate in cats at a dosage of 25 mg. per kg. of body weight produced an immediate marked drop in blood pressure.

The compounds wherein X is oxygen are prepared by the reaction of a compound of the formula MOR wherein M represents hydrogen or an alkali metal, preferably sodium or potassium, with a compound of the formula

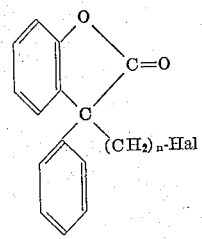

wherein Hal represents chlorine or bromine. Good results are obtained when equimolecular proportions of both reactants are employed and the reaction is carried out in the presence of a hydrohalide acceptor such as triethylamine, pyridine and the like. The reaction takes place smoothly from room temperature to the boiling temperature of the reaction mixture. In general, steam bath temperature is sufficient to complete the reaction. The desired product is readily isolated by filtering the reaction mixture, concentrating the filtrate to dryness, dissolving the dry residue in ether and adding a slight excess of ethereal hydrogen chloride to precipitate the HCl salt which is thereafter recrystallized from a suitable organic solvent. Basic esters which do not form crystalline hydrochlorides are isolated either by vacuum distillation or by crystallization as the free base.

The compounds wherein X is sulfur are best prepared by the reaction of equimolecular proportions of a compound of the formula RSH and a compound of the formula

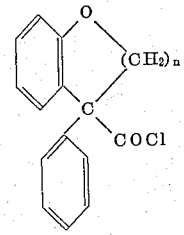

in the presence of a hydrohalide acceptor such as triethylamine at from room temperature to the boiling temperature of the reaction mixture. The desired product is isolated in the form of the free base or as an acid-addition salt, preferably as the hydrochloride, in the same manner as that described in the preceding paragraph.

The following examples and procedures illustrate methods for preparing the new compounds but are not to be construed as limiting the invention to the exact proportions or steps employed therein.

PROCEDURE 1

A mixture of 12.1 g. (0.04 mole) of 3-bromomethyl-3-phenyl-2-benzofuranone, 4.7 g. (0.04 mole) of β-diethylaminoethanol and 25 ml. of triethylamine was heated on the steam bath for 18 hours. The cooled reaction mixture was filtered to remove triethylamine hydrochloride and the filtrate was concentrated to dryness under reduced pressure. The residue was taken up in ether, washed with water and dried over anhydrous magnesium sulfate. Filtration and removal of the ether by evaporation gave 11.2 g. (84% yield) of crude β-diethylaminoethyl 3 - phenyl - 2,3 - dihydro-3-benzofurancarboxylate which was redissolved in dry ether and treated with a slight excess of ethereal hydrogen chloride. The precipitated HCl salt after recrystallization from 2-butanone-ether melted at 125°–127° C. and contained 3.77% nitrogen compared to the theoretical value of 3.73% nitrogen.

PROCEDURE 2

To 3 grams (0.026 mole) of β-diethylaminoethanol in 15 ml. of 1,2-dimethoxyethane was added portionwise 1.25 g. (0.026 mole) of a 50% mineral oil suspension of sodium hydride at a temperature of 50° C. After gas evolution ceased, the mixture was cooled to room temperature and 8.3 g. (0.025 mole) of 3-(γ-bromopropyl)-3-phenyl-2-benzofuranone was added portionwise with stirring. After standing overnight, the reaction mixture was treated with 100 ml. of cold water and processed as described in Procedure 1 to obtain the hydrochloride salt of β-diethylaminoethyl 5-phenyl-2,3,4,5-tetrahydro-1-benzoxepin-5-carboxylate melting at 193–194° C. This salt contained 3.44% nitrogen which agreed with the calculated value for nitrogen.

PROCEDURE 3

A solution of 4.1 g. (0.017 mole) of 3-phenyl-2,3-dihydro-3-benzofurancarboxylic acid and 3.6 g. (0.03 mole) of thionyl chloride in 25 ml. of dry benzene was refluxed for two hours. The excess thionyl chloride and benzene was removed by distillation under reduced pressure. The residual oil was dissolved in 25 ml. of dry 1,2-dimethoxyethane and added dropwise to a stirred solution of 2.6 g. (0.022 mole) of β-diethylaminoethanol and 3 g. (0.03 mole) of triethylamine in 75 ml. of dry 1,2-dimethoxyethane. The temperature rose spontaneously to 33° C. and an insoluble salt formed. After the exothermic reaction stopped, the mixture was stirred and warmed at 50° C. for 3 hours and thereafter stirred overnight at room temperature. The insoluble salt was removed by filtration and the filtrate concentrated to dryness under reduced pressure. The residue was treated with 100 ml. of cold water and processed as described in Procedure 1 to obtain the hydrochloride salt of β-diethylaminoethyl 3-phenyl - 2,3 - dihydro - 3 - benzofurancarboxylate which melted at 125°–127° C.

PROCEDURE 4

A solution of 9.2 g. (0.032 mole) of 5-phenyl-2,3,4,5-tetrahydro-1-benzoxepin-5-carboxylyl chloride, 3.74 g. (0.032 mole) of β-diethylaminoethanol and 3.3 g. (0.032 mole) of triethylamine in 150 ml. of dry benzene was refluxed for 16 hours. The reaction mixture was thereafter processed as described in Procedure 1 to obtain the hydrochloride salt of β-diethylaminoethyl 5-phenyl-2,3,4,5-tetrahydro-1-benzoxepin-5-carboxylate melting at 194°–195° C.

PROCEDURE 5

To a solution of 9.6 g. (0.04 mole) of the acid chloride of 3-phenyl-2,3-dihydro-3-benzofurancarboxylic acid in 30 ml. of triethylamine was added with stirring 4.6 g. (0.04 mole) of 4-hydroxy-1-methylpiperidine. The mixture was stirred for 3 hours at room temperature and then allowed to stand overnight. After heating for one hour on the steam bath, the cooled reaction mixture was treated with 50 ml. of cold water, extracted with ether and crystallized to obtain the desired (1-methyl-4-piperidyl) 3-phenyl-2,3-dihydro-3-benzofurancarboxylate as the free base melting at 103°–104° C. This base contained 4.19% nitrogen as compared to the theoretical value of 4.15%.

Other esters wherein X is oxygen in the general formula were prepared from the appropriate starting materials according to the foregoing procedures as shown in the following table.

*Table I*

| n Equals— | R equals— | Procedure | B.P. or M.P.* in degrees C. | Percent nitrogen Calculated | Percent nitrogen Found |
|---|---|---|---|---|---|
| 1 2 3 | —CH$_2$CH$_2$N(CH$_3$)$_2$·HCl | 1 1 4 | 151–152* 212–213* 214–215* | 4.03 3.87 3.64 | 4.06 3.88 3.79 |
| 1 2 3 | —CH$_2$CH$_2$N[CH(CH$_3$)$_2$]$_2$ | 1 1 4 | 193 at 1 mm 158–159* (HCl salt) 135–136* (HCl salt) | 3.81 3.35 3.24 | 3.65 3.39 3.30 |
| 1 2 3 | —CH$_2$CH$_2$N⟨ ⟩ | 1 1 4 | 201 at 1.2 mm 212 at 1.4 mm 203–206* (HCl salt) | 4.15 3.99 3.41 | 3.90 3.79 3.40 |
| 1 2 3 | —CH$_2$CH$_2$N⟨ ⟩·HCl | 1 1 4 | 148–149* 159–160* 203–204* | 3.61 3.48 3.30 | 3.84 3.43 3.16 |
| 1 2 3 | —CH$_2$CH$_2$N⟨ ⟩N—CH$_3$·2HCl | 1 1 4 | 231–232* 238–239* 242–244* | 6.38 6.18 5.99 | 6.36 6.12 6.01 |
| 1 2 3 | —CH$_2$(CH$_3$)CH$_2$N(CH$_3$)$_2$·HCl | 2 2 4 | 187–188* 197 at 1.6 mm (base) 200–201* | 3.87 4.13 3.59 | 3.85 4.10 3.59 |
| 1 2 3 | —CH(CH$_3$)CH$_2$N⟨ ⟩ | 2 2 4 | 200 at 1.1 mm 202 at 1 mm 199–200* (HCl salt) | 3.99 3.83 3.37 | 3.98 3.77 3.36 |
| 1 2 3 | —CH(CH$_3$)CH$_2$N⟨ ⟩ | 2 2 4 | 196 at 1 mm 207 at 1.5 218–220* (HCl salt) | 3.83 3.69 3.25 | 3.91 3.58 3.05 |
| 1 2 3 | —CH(CH$_3$)CH$_2$N⟨ ⟩ | 2 2 4 | 208 at 1.4 mm 216 at 1.6 mm 223–224* (HCl salt) | 3.69 3.55 3.15 | 3.66 3.55 3.13 |
| 1 2 3 | —CH$_2$CH$_2$—⟨ ⟩ N CH$_3$ | 1 1 4 | 216 at 1.3 mm 227 at 1.3 mm 226 at 1 mm | 3.83 3.69 3.55 | 3.91 3.66 3.60 |

Table 1—Continued

| n Equals— | R equals— | Procedure | B.P. or M.P.* in degrees C. | Percent nitrogen Calculated | Percent nitrogen Found |
|---|---|---|---|---|---|
| 1 | —CH₂—(N-methylpiperidine) | 1 | 198 at 1 mm | 3.99 | 3.95 |
| 2 | | 1 | 208 at 1 mm | 3.83 | 3.85 |
| 3 | | 4 | 233–234* (HCl salt) | 3.37 | 3.30 |
| 1 | (N-methylpiperazine) —N—CH₃ | 2 | 90–91* | 4.15 | 4.15 |
| 2 | | 2 | 181 at 2 mm | 3.99 | 3.89 |
| 3 | | 4 | 211–212* (HCl salt) | 3.48 | 3.32 |
| 1 | CH₂—CH—CH₂ \ N—CH₃ CH— / CH₂—CH—CH₂ | 2 | 97–98* | 3.85 | 3.71 |
| 2 | | 2 | 175–177* (HCl salt) | 3.38 | 3.18 |
| 3 | | 4 | 129–130* | 3.57 | 3.50 |
| 2 | —CH₂CH₂N(C₂H₅)₂·HCl | 1 | 157–158* | 3.59 | 3.40 |

β - Diethylaminoethyl 3 - phenyl - 2,3 - dihydro 3 - benzofurancarbothiolate was prepared by the reaction of 9.6 g. (0.04 mole) of the acid chloride of 3-phenyl-2,3-dihydro-3-benzofurancarboxylic acid and 6.6 g. (0.04 mole) of β-diethylaminoethanethiol according to the method described in Procedure 5. The thiol ester was obtained as a light yellow oil boiling at 188°–189° C. at 1 mm. and upon analysis was found to contain 4.12% nitrogen compared to the calculated value of 3.94% nitrogen.

By substituting β-diethylaminoethanethiol for the β-diethylaminoethanol in Procedure 4, the hydrochloride salt of β-diethylaminoethyl 5-phenyl-2,3,4,5-tetrahydro-1-benzoxepin-5-carbothiolate was obtained as a crystalline solid melting at 165°–166° C. It contained 3.33% nitrogen which corresponded to the calculated value for nitrogen.

The 3-haloalkyl-3-phenyl-2-benzofuranones employed as one of the starting materials in the present invention are prepared by the reaction of equimolecular proportions of an alkali metal derivative of 3-phenyl-2-benzofuranone and a dihaloalkane of the formula $X—(CH_2)_n—X$ wherein each X is chlorine or bromine in the presence of an inert organic solvent such as benzene or dimethylformamide at from about 0° C. to the reflux temperature of the reaction mixture. Upon completion of the reaction, the alkali metal halide which precipitates is removed by filtration, the filtrate is concentrated and the residue is distilled or crystallized from a suitable solvent to obtain the desired product as a mobile liquid or crystalline solid.

The carboxylic acids employed as starting materials are prepared by reacting the 3-haloalkyl-3-phenyl-2-benzofuranones with an alkali metal hydroxide in an aqueous medium at from room temperature to the reflux temperature of the reaction mixture. When the reaction is complete, the mixture is acidified to precipitate the desired product which is thereafter crystallized from a suitable organic solvent. The corresponding carboxylyl chlorides are prepared by refluxing the appropriate carboxylic acid with an excess of thionyl chloride in benzene and thereafter removing the benzene by distillation under reduced pressure.

What is claimed is:

1. A member of the group consisting of a compound of the formula

[structure: benzofuran with O, (CH₂)ₙ, C bearing COXR and phenyl]

wherein n is a whole number from 1 to 3 inclusive, X is a member of the group consisting of oxygen and sulfur and R is a radical selected from the group consisting of $$—CH_2CH_2N(C_2H_5)_2$$
$$—CH_2CH_2N(CH_3)_2$$
$$—CH_2CH_2N[CH(CH_3)_2]_2$$
—CH₂CH₂N⟨cyclopentyl⟩
—CH₂CH₂N⟨cyclohexyl⟩
—CH₂CH₂N⟨piperazinyl⟩NCH₃
$$—CH(CH_3)CH_2N(CH_3)_2$$
—CH(CH₃)CH₂N⟨cyclopentyl⟩
—CH(CH₃)CH₂N⟨cyclohexyl⟩
—CH(CH₃)CH₂N⟨cycloheptyl⟩
—CH₂CH₂—N(piperidinyl, N—CH₃)
—CH₂—(piperidinyl, N—CH₃)

and

CH₂—CH—CH₂
      \\
       N—CH₃   CH—
      /
CH₂—CH—CH₂ and the non-toxic, pharmacologically acceptable, acid-addition salts thereof.

2. A compound of the formula

[structure: benzofuranone with O, CH₂, C bearing COOR and phenyl]

wherein R is diloweralkylaminoethyl.

3. A compound of the formula

[structure: benzofuran with (CH₂)₂, phenyl, COOR]

wherein R is diloweralkylaminoethyl.

4. A compound of the formula

[structure: benzopyran with (CH₂)₃, phenyl, COOR]

wherein R is diloweralkylaminoethyl.

5. β-Diethylaminoethyl 3-phenyl-2,3-dihydro-3-benzofurancarboxylate.

6. β-Diethylaminoethyl 4-phenyl-4-chromancarboxylate.

7. β-Diethylaminoethyl 5-phenyl-2,3,4,5-tetrahydro-1-benzoxepin-5-carboxylate.

8. β-Piperidinoethyl 5-phenyl-2,3,4,5-tetrahydro-1-benzoxepin-5-carboxylate.

9. β-Pyrrolidinoethyl 3-phenyl-2,3-dihydro-3-benzofurancarboxylate.

10. (1-methyl-3-piperidylmethyl) 4-phenyl-4-chromancarboxylate.

11. β-Diethylaminoethyl 5-phenyl-2,3,4,5-tetrahydro-1-benzoxepin-5-carbothiolate.

12. A method for the preparation of a compound of the formula

[structure with (CH₂)ₙ, phenyl, COOR]

wherein $n$ is a whole number from 1 to 3 inclusive and R is a radical selected from the group consisting of:

—CH₂CH₂N(C₂H₅)₂
—CH₂CH₂N(CH₃)₂
—CH₂CH₂N[CH(CH₃)₂]₂
—CH₂CH₂N⟨pyrrolidine⟩
—CH₂CH₂N⟨piperidine⟩
—CH₂CH₂N⟨N-methylpiperazine⟩NCH₃
—CH(CH₃)CH₂N(CH₃)₂
—CH(CH₃)CH₂N⟨pyrrolidine⟩
—CH(CH₃)CH₂N⟨piperidine⟩
—CH(CH₃)CH₂N⟨hexamethyleneimine⟩
—CH₂CH₂—⟨N-methylpiperidine⟩

—CH₂—⟨N-methylpiperidine⟩

—⟨N-methylpiperidine-4-yl⟩NCH₃ and

[structure: 2,6-dimethyl-morpholine-like / dimethylpiperazine cage]

which comprises reacting equimolecular proportions of a compound of the formula

[structure with C=O, (CH₂)ₙ-Hal, phenyl]

wherein $n$ is a whole number from 1 to 3 inclusive and Hal is a halogen selected from the group consisting of chlorine and bromine with a compound of the formula

MOR wherein M is selected from the group consisting of hydrogen and an alkali metal and R is a radical selected from the group previously defined in the presence of a hydrohalide acceptor at from room temperature to the boiling temperature of the reaction mixture and recovering the resulting product.

13. A compound of the formula

[structure: benzofuran-CH₂, C-COO-CH with dimethylpiperazine substituent, phenyl]

14. A compound of the formula

[structure: chroman (CH₂)₂, C-COO-CH with dimethylpiperazine, phenyl]

15. A compound of the formula

[structure: benzoxepin (CH₂)₃, C-COO-CH with dimethylpiperazine, phenyl]

References Cited in the file of this patent
UNITED STATES PATENTS
2,901,507   Speeter et al. _____ Aug. 25, 1959